No. 877,368. PATENTED JAN. 21, 1908.
H. S. PUTNEY.
PIPE COUPLING.
APPLICATION FILED MAR. 20, 1906.
2 SHEETS—SHEET 1.
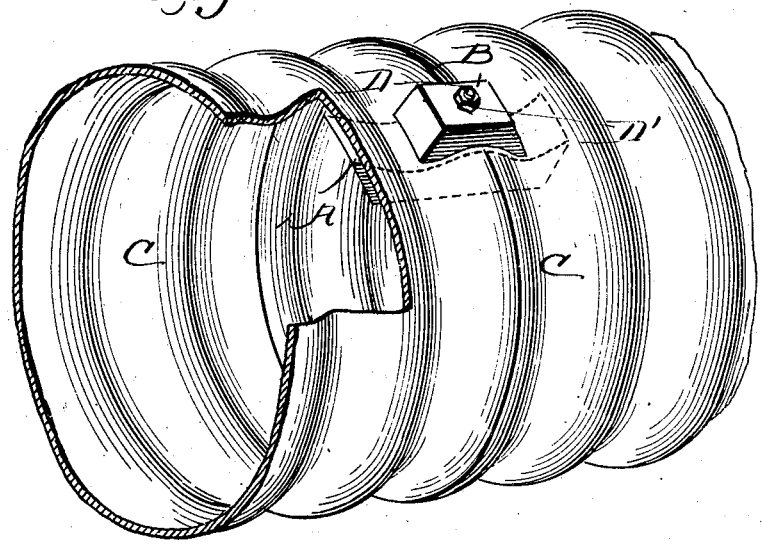
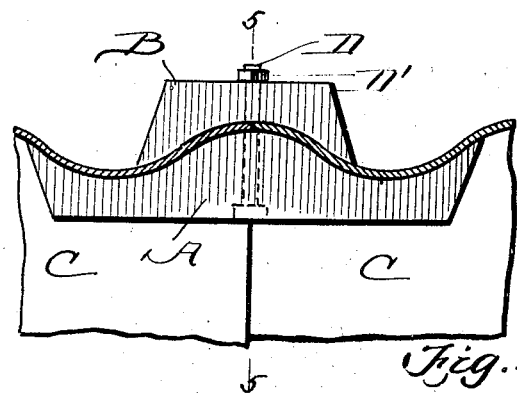
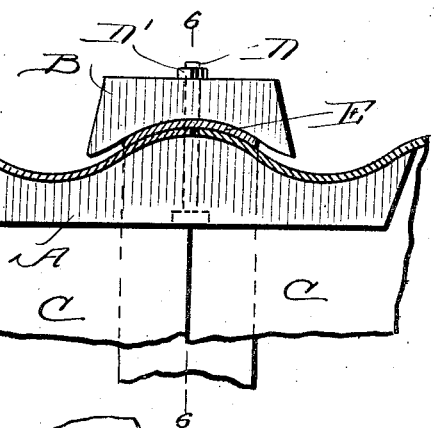
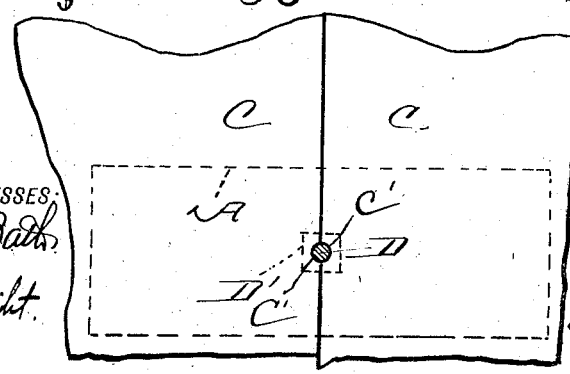
WITNESSES:
E. B. M. Bath
Rea Albright
INVENTOR
H. S. Putney.
BY
Meara & Brock
ATTORNEYS No. 877,368.
PATENTED JAN. 21, 1908.
H. S. PUTNEY.
PIPE COUPLING.
APPLICATION FILED MAR. 20, 1906.
2 SHEETS—SHEET 2.
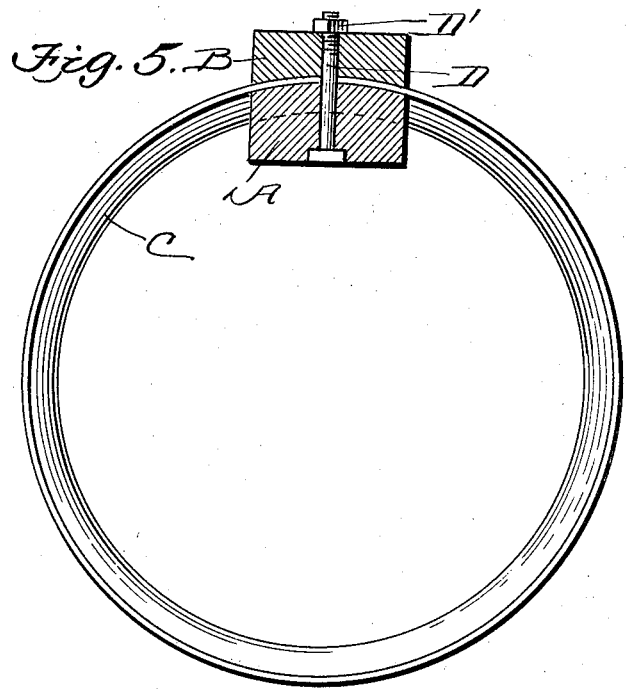
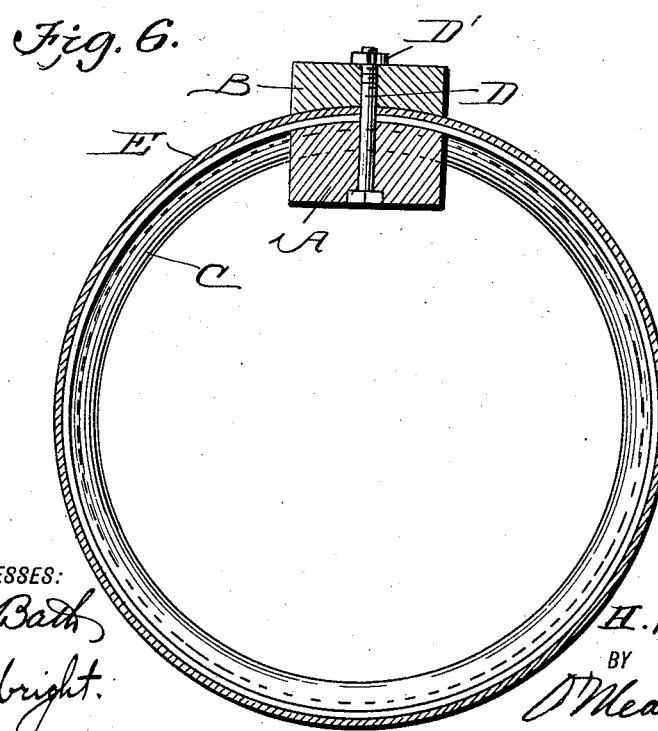
WITNESSES:
INVENTOR
H. S. Putney.
BY
ATTORNEYS

UNITED STATES PATENT OFFICE.

HERBERT S. PUTNEY, OF SANDUSKY, MICHIGAN.

PIPE-COUPLING.

No. 877,368.　　　Specification of Letters Patent.　　　Patented Jan. 21, 1908.

Application filed March 20, 1906. Serial No. 307,128.

*To all whom it may concern:*

Be it known that I, HERBERT S. PUTNEY, a citizen of the United States, residing at Sandusky, in the county of Sanilac and State of Michigan, have invented a new and useful Improvement in Pipe-Couplings, of which the following is a specification.

This invention relates to pipe couplings and more particularly to couplings for corrugated pipes, used for culverts and water mains, the object being to provide a coupling which is very simple and cheap in construction and one which will overcome the difficulties now existing in riveting the sections together.

Another object of my invention is to provide a pair of coupling members adapted to be clamped together over the meeting end of the sections.

This invention consists of the novel features of construction hereinafter fully described, and pointed out in the claims.

In the drawings forming a part of this specification:—Figure 1 is a perspective view of the pipe section partly broken away, showing the coupling member in place. Fig. 2 is a detail longitudinal sectional view of the pipe section showing the coupling members in place. Fig. 3 is a detail longitudinal sectional view showing an extra ring arranged between the coupling members. Fig. 4 is a detail plan view of the section. Fig. 5 is a section taken on the line 5—5 of Fig. 2. Fig. 6 is a section taken on the line 6—6 of Fig. 3.

In the drawings forming a part of this specification A, and B, indicate a pair of coupling members adapted to connect the ends of the corrugated pipe section.

The member A is preferably formed of an oblong block having beveled ends and a transverse fluted face adapted to be arranged under the meeting ends of the corrugated sections C, which are provided with notches C', registering with each other. An opening is formed through the center of the member A, surrounded by a square recess on its bottom in which the head of a bolt D, is adapted to be secured, which passes up through openings in the block and out through the notches in the pipe sections C.

The member B, is formed of an oblong block having beveled ends and a transverse concaved face provided with a central opening. The block is adapted to fit over the bolt D, and be clamped over the meeting ends of the sections C, by the nut D'.

When it is desired to form a perfect water joint, a ring E is placed over the meeting ends of the sections under the block B, provided with an opening through which the bolt D, is adapted to pass. It is of course understood that any number of these members can be used as desired.

From the foregoing description it can be readily seen that I have provided a pipe coupling which can be easily and quickly attached and one that is very effective in use.

Having thus fully described my invention, what I claim as new and desire to secure by Letters Patent is:—

1. A pipe coupling comprising fluted blocks adapted to be arranged under and over the ends of the pipe sections a ring arranged over said sections, and means for clamping said blocks together for the purpose described.

2. A pipe coupling comprising a fluted block adapted to be arranged under the end of the pipe sections, a ring arranged over said ends, a concaved block arranged over said ring, and means for clamping said blocks together; for the purpose set forth.

3. In a pipe coupling, the combination with notched pipe sections, of a fluted block arranged under the meeting ends of said sections, a ring arranged over said ends, and a concaved block arranged over said ring connected to the fluted block, for the purpose described.

4. A coupling for corrugated pipe comprising a transverse fluted apertured block adapted to be arranged under the notched ends of the corrugated pipe sections in the grooves and ribs of the same, a transverse concaved apertured block adapted to be arranged on said notched ends of the pipe sections over the ribs of the same, and a bolt adapted to pass through said block and notched ends and lock the blocks together for the purpose described.

HERBERT S. PUTNEY.

Witnesses:
CHAS. J. OLESON,
J. H. HANDS.